United States Patent

[11] 3,524,393

| [72] | Inventors | Paul Greger<br>Braunschweig, Germany;<br>Walter Gutmann, Braunschweig,<br>Germany; Friedrich Papke, Braunschweig,<br>Germany; Richard Sommer,<br>Braunschweig, Germany |
|---|---|---|
| [21] | Appl. No. | 669,759 |
| [22] | Filed | Sept. 22, 1967 |
| [45] | Patented | Aug. 18, 1970 |
| [73] | Assignee | Voigtlander AG<br>Braunschweig, Germany |
| [32] | Priority | Sept. 27, 1966 |
| [33] | | Germany |
| [31] | | V 19,458 |

[54] CAMERA HAVING A RECEPTACLE FOR A SOURCE OF CURRENT
6 Claims, 3 Drawing Figs.

[52] U.S. Cl.................................................. 95/11,
95/31, 95/53
[51] Int. Cl......................................................G03b 19/00,
G03b 19/04
[50] Field of Search............................................. 95/11,
31Elec, 53Elec; 240/1.3

[56] References Cited
UNITED STATES PATENTS

| 3,138,080 | 6/1964 | Jacobson.................. 95/31(Elect)UX |
| 3,315,580 | 4/1967 | Fischer..................... 95/11(Lamp)UX |

FOREIGN PATENTS

| 1,457,814 | 11/1965 | France..................... | 95/11 |
| 1,048,486 | 11/1966 | Great Britain......... 95/11(Lamp)UX |

*Primary Examiner*— Norton Ansher
*Assistant Examiner*— Robert P. Greiner
*Attorney*—Blum, Moscovitz, Friedman, and Kaplan ABSTRACT: A camera, such as a still or motion picture camera, which does not have in its interior sufficient space to accommodate a source of current. The camera has a structure which has an exterior surface which forms part of the exterior of the camera, and a receptacle is fixedly mounted on this exterior surface of the latter structure for accommodating a source of current in the interior of the receptacle. A cover is provided for the receptacle for closing and opening the latter, and this cover is accessible from the exterior of the camera.

Patented Aug. 18, 1970
3,524,393
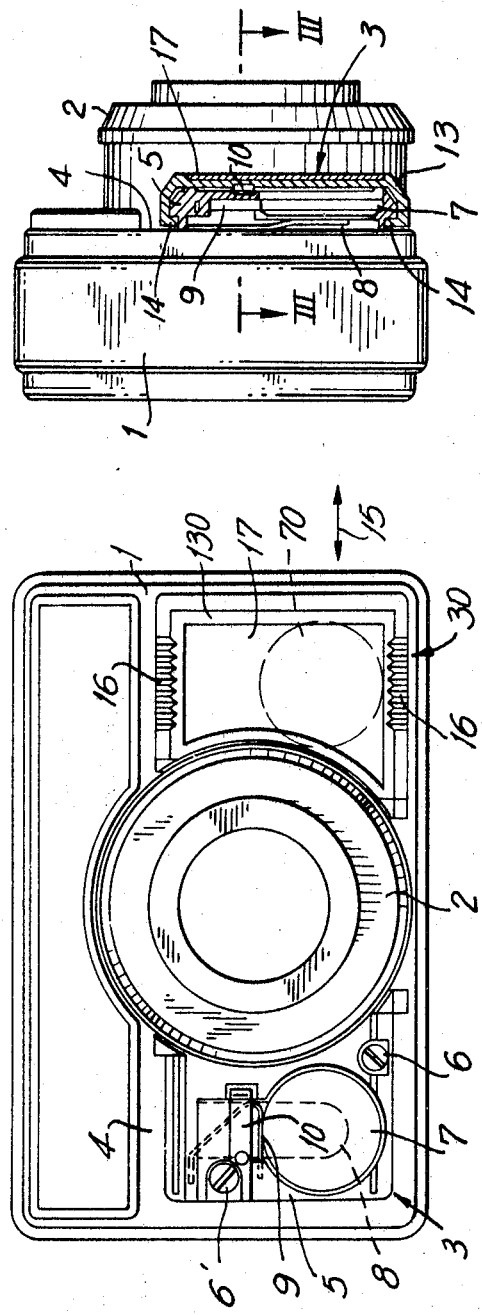
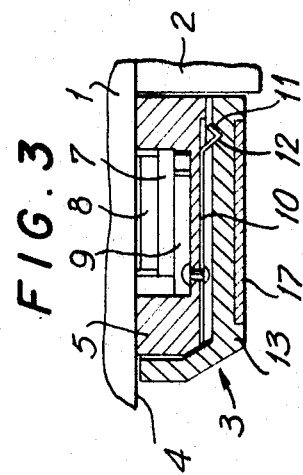

3,524,393

CAMERA HAVING A RECEPTACLE FOR A SOURCE OF CURRENT

BACKGROUND OF THE INVENTION

The present invention relates to cameras.

In particular, the present invention relates to that type of camera which has a receptacle for a source of current.

It is already known to provide in the interior of a camera a receptacle for a source of current, this latter receptacle either being accessible from the exterior of the camera or being accessible from the interior of the camera after the latter has been opened.

There are also known cameras provided with at least one reflector and a flash tube of an electronic flash device, these components being permanently built into the camera. Such cameras have a coupling structure enabling a separate housing to be removably connected to the camera with a cooperating coupling. In this latter housing which can be separated from the camera there is at least one source of current for the electronic flash device. A housing of this latter type has a removable cover for the battery chamber. When exposures are made without flash illumination, the above housing need not be coupled to the camera. Thus, this housing is an additional component of the camera which, as required, can be mechanically and electrically connected with the camera.

SUMMARY OF THE INVENTION

It is a primary object of the present invention to provide in a simple manner, for a camera which does not have in its interior sufficient space for a source of current, the possibility of connecting a source of current to the camera when a source of current is required to supply power for components which function electrically and which are set into operation in connection with each exposure, such electrically operating components being added to the camera after it is built in order to convert the camera from one type to another type.

In particular, it is an object of the present invention to provide for a camera which cannot accommodate a source of current in its interior a structure which enables the camera to be provided with a source of current while at the same time permitting the interior of the camera to remain substantially undisturbed and without substantially increasing the exterior dimensions of the camera.

Furthermore, it is an object of the present invention to provide a construction of this type which will blend into the exterior of the camera without undesirably influencing in any way the operation thereof.

In accordance with the invention the camera has a structure provided with an exterior surface which forms part of the exterior of the camera, and on this latter exterior surface of the latter structure is fixedly mounted a receptacle means which is capable of accommodating a source of current in its interior. A cover means coacts with the receptacle means to render the latter accessible from the exterior of the camera. Thus, the receptacle means can be fixed either to an exterior surface of the camera housing or to an exterior surface of the objective holder of the camera, and the structure of the invention is not of the above known type where it is removably connected to the camera so as to be removed therefrom when not required and so as to be mounted thereon when required. Instead, the structure of the invention forms a permanent part of the camera and is permanently incorporated into the structure thereof.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention reference is had to the following description taken in connection with the accompanying drawings, in which:

FIG. 1 is a schematic front elevation of a camera according to the invention provided with a pair of battery receptacles one of which is illustrated in a closed condition and the other of which is illustrated in an open condition;

FIG. 2 is a side view of the structure of FIG. 1, as seen from the left side of the latter, and in FIG. 2 the receptacle means and cover means of the invention is illustrated in section; and FIG. 3 is a fragmentary sectional plan view taken along line III-III of FIG. 2 in the direction of the arrows and showing the battery accommodating structure of the invention at a scale which is enlarged as compared to FIGS. 1 and 2.

DESCRIPTION OF PREFERRED EMBODIMENTS

A camera 1 (FIGS. 1 and 2) is illustrated in the drawings, and this camera has a housing which carries at its front wall a unit 2 composed of an objective and a between-the-lens shutter.

The camera includes sources of current for electrically operating camera components such as, for example, an electronically operating shutter, an exposure meter, an indicating device, or the like. These sources of current are provided, in accordance with the invention, at the exterior surface of a structure whose exterior surface forms part of the exterior of the camera, and the sources of current are accommodated without any substantial influence on the interior of the camera housing. In the illustrated example it is the camera housing itself which forms the structure which has the exterior surface forming part of the exterior of the camera and carrying the structure of the invention. Thus, the structure of the invention is mounted on an exterior surface of an outer wall of the camera housing.

In the illustrated example there are a pair of receptacle means 3 and 30 respectively situated on opposite sides of the unit 2 at the exterior surface of the front wall 4 of the camera housing. Each of these receptacle means includes a housing 5 capable of being opened and closed by a cover means, and this housing 5 is preferably made of an electrically non-conductive material. The housing 5 of each receptacle means is fixed to the front wall 4 of the camera by a pair of screws 6 and 6'. Each housing has a predetermined location in its interior for seating a disc battery of button-shaped configuration therein, and the receptacle means 3 is capable of accommodating in its interior such a battery 7 while the receptacle means 30 is capable of accommodating in its interior a battery 70 of this type. Each battery has a pair of poles which are respectively contacted by a pair of contacts 8 and 9 in the form of leaf-springs. Moreover, each housing 5 has a detent means which includes an elongated leaf spring 10 fixed to the housing 5 and terminating in a substantially V-shaped free end 11 (FIG. 3) forming a detent element capable of being received in a detent recess 12. This detent recess 12 is formed at the inner surface of a cover means 13 capable of opening and closing the receptacle means 3 and at the inner surface of a cover means 130 capable of opening and closing the receptacle means 30. Each of these cover means 13 and 130 is in the form of slidable cover member capable of being shifted to positions where the receptacle means is opened or closed. At its upper and lower edges each cover means is provided with an inwardly extending angular lip 14 (FIG. 2) forming at the inner upper and lower edges of each slidable cover a groove in which is received a rail formed along the upper and lower edge of the housing 5 of the receptacle means. Thus, the covers 13 and 130 are capable of being shifted in the direction of the double-headed arrow 15 (FIG. 1) for opening and closing the receptacle means. The closed position of each cover means is determined by the snapping of the detent projection 11 into the recess 12. In order to facilitate handling of the cover 13 or 30, their upper and lower edge portions are respectively formed with rows of gripping notches 16 (FIG. 1). The exterior surface of the unit formed by the receptacle means and the cover therefor is provided with an appearance and properties conforming to that of the exterior surface of the wall 4 of the housing which surrounds and is in the region of the structure of the invention. For example, the covers 13 and 130 may each be provided with a leather coating 17 to harmonize the structure of the invention with the adjoining camera structure.

The above-described receptacle means of the invention are particularly suitable for mounting on a camera which does not have in its interior any space for a battery, in the case where such a camera, after it is initially built, is provided with devices which are required to be electrically operated.

The contact springs 8 and 9 can be fixed directly to a wall of the housing 5 of each receptacle means. An electrically conductive connection to the device of the camera which is to be electrically operated can then be brought about by way of contact devices in the form, for example, of pins, cables or the like, these devices passing through the housing wall and being guided into the interior of the camera housing. However, it is also possible to mount the contact springs 8 and 9 on the camera housing itself, such as, for example, on insulation plates which are fixed to the front wall 4 of the camera. In this case, the wall of the housing 5 which is directed toward the camera is formed with openings through which the contact spring 8 and 9 extend into the region of the location where the sources of currents 7 and 70 are seated within the receptacles of the invention.

It is possible in accordance with the invention to situate one or more receptacle means having structures along the lines of those described above but located at other parts of the exterior of the camera housing and having exterior configurations which harmonize with the construction of the camera housing itself. Also the receptacle means can be provided with other types of cover means such as, for example, hinged covers.

Of course, the above-described structure which is adapted for use with a still camera can also be used with a motion picture camera.

It will thus be seen that the object set forth above, among those made apparent from the preceding description, are efficiently attained and, since certain changes may be made in the above constructions without departing from the spirit and scope of the invention, it is intended that all matter contained in the above description or shown in the accompanying drawings will be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In a camera structure having an exterior surface forming part of the camera, an objective, receptacle means fixedly mounted forwardly on said exterior surface of said sturcture on opposite sides of said objective for accommodating a source of current in the interior of said receptacle means, and cover means operatively connected to said receptacle means for opening and closing the latter, said cover means being accessible from the exterior of the camera said source of current having a predetermined position in said receptacle means and having poles and having at least one electric contact carried by said structure, said receptacle means having a wall directed towards such structure and formed with an opening in which said one contact extends into engagement with a pole of said source of current.

2. The combination of Claim 1 and wherein a detent means coacts with said cover means for releasably holding the latter in a position closing said receptacle means.

3. The combination of Claim 2 and wherein said cover means is slidable with respect to said receptacle means.

4. The combination of Claim 1 and wherein said structure is a front wall of a camera housing, said front wall carrying an objective, and a pair of said receptacle means being respectively carried by said front wall on opposite sides of said objective, respectively, and a pair of said cover means respectively coacting with said pair of receptacle means for closing and opening the latter, said pair of receptacle means being adapted to accommodate in their interiors a pair of sources of current.

5. The combination of Claim 4 wherein a detent means coacts with said cover means for releasably holding the latter in a position closing receptacle means.

6. The combination of Claim 5 wherein said cover means is slideable with respect to said receptacle means.